March 13, 1956  J. PFISTERSHAMMER  2,738,297
HONEY-COMB-TYPE STRUCTURAL MATERIALS
AND METHOD OF MAKING SAME
Filed June 10, 1952  3 Sheets-Sheet 1

Inventor:
Joseph Pfistershammer
By C. M. Avery
Attorney

March 13, 1956

J. PFISTERSHAMMER 2,738,297

HONEY-COMB-TYPE STRUCTURAL MATERIALS AND METHOD OF MAKING SAME

Filed June 10, 1952

Inventor:
Joseph Pfistershammer
By C. U. Avery
Attorney

March 13, 1956  J. PFISTERSHAMMER  2,738,297
HONEY-COMB-TYPE STRUCTURAL MATERIALS
AND METHOD OF MAKING SAME
Filed June 10, 1952  3 Sheets-Sheet 3

Inventor
Joseph Pfistershammer
By C. M. Avery
Attorney

United States Patent Office 2,738,297
Patented Mar. 13, 1956

2,738,297

HONEYCOMB-TYPE STRUCTURAL MATERIALS AND METHOD OF MAKING SAME

Joseph Pfistershammer, Dietikon, Zurich, Switzerland

Application June 10, 1952, Serial No. 292,759

24 Claims. (Cl. 154—52.5)

The present invention relates to new structural materials. The structural materials according to this invention have a lattice-like form and consist at least in part of a component of great strength and ductility (basic material) such as steel, aluminum and the like, or a synthetic material of suitable nature, such as a polyamide, at least part of the basic material being formed in such a manner as to provide curved lines of stress in every direction of stress of the structure.

Such structural materials are employed, for example, in the construction of coverings for vehicles of all kinds, as well as for roofs, walls, floors, ceilings, boilers, containers and the like. The structural material according to the present invention is characterized by its high elastic deformability in all directions of stress. To this end, the basic material is formed so as to provide curved lines of stress, preferably in every direction of stress.

Embodiments of the structural material particularly suited for the purpose of this disclosure consist of a basic material whose entire surface is formed by closely adjacent elevations, or both depressions and elevations so that the structure is fully curved in every principal directions of stress.

For particular applications, it has been found advantageous to employ a second material when producing the structure in addition to the aforementioned basic material. The second material should possess a high degree of hardness and high heat resistance, such as material of a mineral nature. This second material is enclosed as a filling material within hollow spaces provided by the basic material. Such filling material may consist of granular, comminuted or, preferably, spherical particles.

The novel features which I consider characteristic of my invention are set forth with particularity in the appended claims. The invention itself, however, and any additional objects and advantages thereof will best be understood from the following description of several preferred embodiments when read in conjunction with the accompanying drawings, in which:

Figure 1:
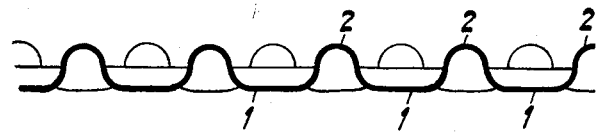
Figs. 1 and 2 are diagrammatic sectional views illustrating the principle incorporated in structures of the present invention, Fig. 1 being a sectional view on the line I—I on Fig. 2.
Figure 2:
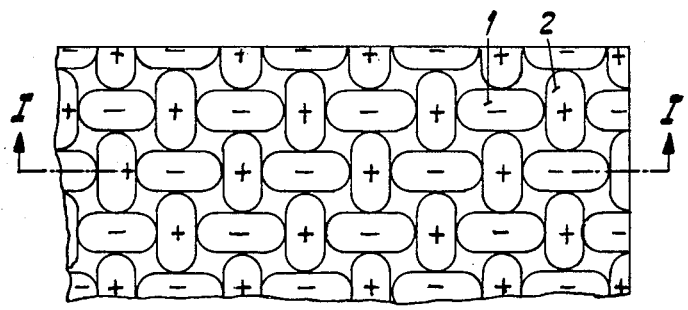

The structural material diagrammatically illustrated in Figs. 1 and 2 is provided, throughout its area, with closely adjacent depressions and elevations 1 and 2 respectively. These depressions and elevations are of elongated shape and are alternately vertically offset against each other. In order to clearly understand the principle applied, the depressions have been marked "—" and the elevations "+" in Fig. 2. As may be seen, this structural material possesses only curved lines of stress in every principal direction of stress. The plan view of Fig. 2 particularly shows that, because of the arrangement of the depressions and elevations 1 and 2, respectively, the lines of stress obtained are curved to a higher or lesser degree. Alternatively, such elevations and depressions may be circular instead of oval, and be pressed into a plate in the shape of hemispheres.

Figure 3:
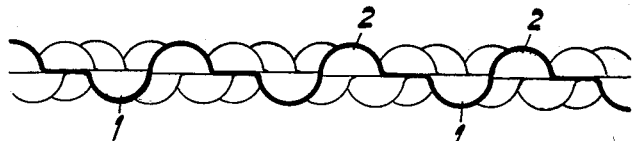
Fig. 3 is a sectional view taken on the line III—III of Fig. 4, both showing a construction in which the depressions and elevations are formed and arranged differently from those shown in Figs. 1 and 2.
Figure 4:
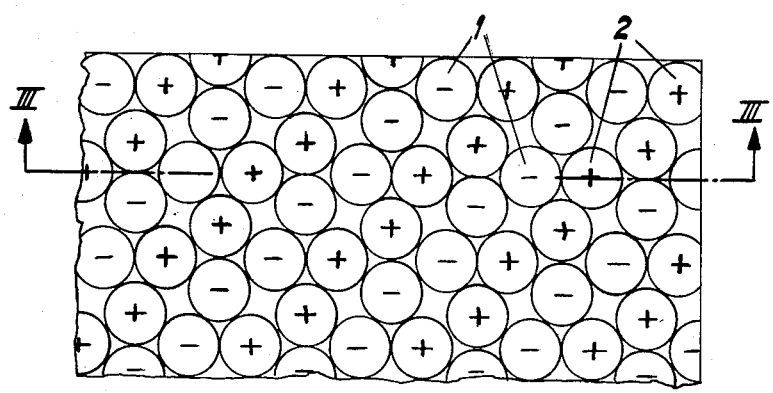

In a preferred arrangement of hemispherical domes in pairs, the edges of the domes touch in the direction of the common center line, so that the common center lines of adjacent pairs of hemispheres are normal to each other and intersect at the point of contact between two paired hemispheres, as appears from Figs. 3 and 4. It is understood that all depressions and elevations need not be of identical size and shape, and, particularly for laminations used individually or on the outside, depressions or elevations may be used alone.

Figure 5:
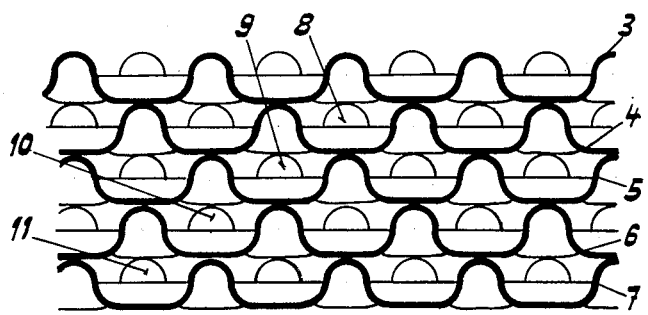
Fig. 5 is a sectional view of a first embodiment of a structure made up of basic material.

Fig. 5 shows a structural material comprising, in parts 3 to 7, a plurality of elements shown in Figs. 1 and 2, assembled in such a manner that the depressions of one element and the elevations of the adjacent element engage each other. Parts 3 to 7 of the structural material may be welded or riveted together at their points of contact. However when made from materials such as plastic, the multiple elements may be produced together in a single casting. The lattice work making up the structure produces a plurality of closed hollow spaces 8–11, whereby high resistance is attained against penetration of structures of this type. Moreover, such structures are largely heat and sound proof.

In many cases structural material must possess a smooth exterior surface in case of coverings for vehicles, etc. To this end, the structure may be covered, at least on one side and vertically to the principal directions of stress, by a material having a smooth surface instead of the afore-described depressions and elevations.

Figure 6:
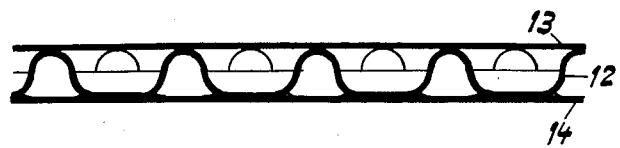
Fig. 6 is a sectional view of another embodiment of a structure made up of basic material.

Fig. 6 shows such a structure comprising an element 12 similar to the elements 1, 2 shown in Figs. 1 and 2, and having flat plates 13 and 14, respectively, affixed to the two sides thereof. The structure possesses fully curved lines of stress transversely to principal directions of stress only, while comprising straight lines in the directions of minor stress. According to an additional feature of the invention, sheets may be assembled whose dome-shaped elevations or depressions and elevations differ in size and spacing, provided that the number of the depressions and elevations in one sheet is an even multiple of those in the other sheet. For example, the depressions and elevations of the outer sheet may have a size and be arranged at a distance of one-third to one-half of those of the intermediate sheets.

Figure 7:
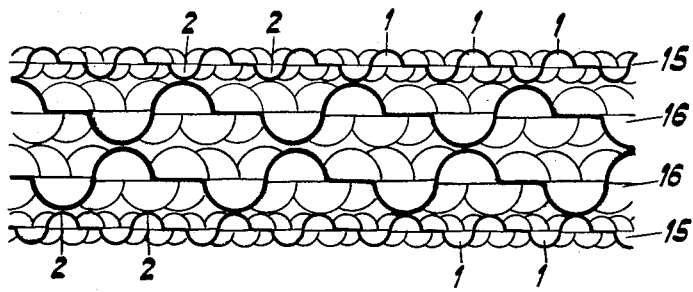
Fig. 7 is the embodiment of a structure wherein, according to the invention, laminations of different basic materials are employed.

Fig. 7 shows an embodiment wherein the spacing between the elevations and depressions 1 and 2, respectively, of the outer sheets 15 is only one-half of that of the intermediate sheets 16. Such structures are suitable, for example, as surface to be walked on (floors). The interior sheets are provided with comparatively large depressions and elevations, respectively, while the outer sheets have small depressions and elevations the number of which is an even multiple of the larger depressions and elevations. The depth of the depressions and elevations in the outer and inner sheets, respectively, may vary as well, as appears from the example shown in Fig. 7. The dome-shaped elevations may also be disposed on one side only in order to prevent or render more difficult the catching of water or dust if the structure is employed, say, as a roofing material. Structures with elevations disposed on one side only may, however, also be employed for protecting jackets of boilers, or for containers and the like.

Figure 8:
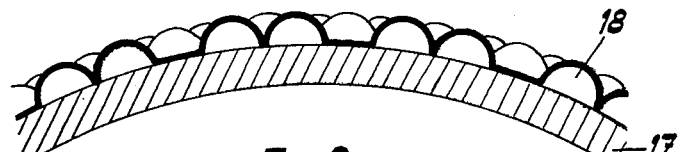
Fig. 8 is the embodiment of a curved structure made according to this invention.

Fig. 8 shows the manner in which a boiler wall 17 is reinforced with a structure having elevations on one side only.

Figure 9:
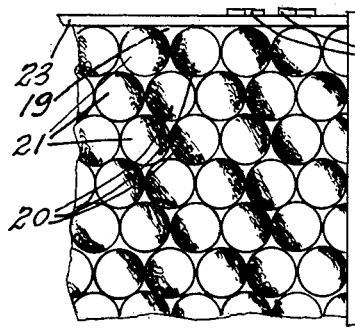
Figs. 9 and 10 are front and end views, respectively, of a structure (partly shown in section in Fig. 10) and consisting of basic materials and a filling material according to the invention, is inserted within the hollow spaces of the basic material.
Figure 10:
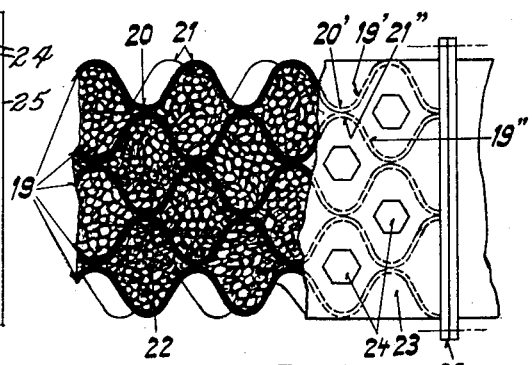

The structural material shown in Figs. 9 and 10 comprises a plurality of laminations 19 of the basic material. As shown in detail in Fig. 10, these laminations are provided with closely adjacent depressions and elevations 20 and 21, respectively, distributed over the entire surface and assembled in such a manner that the depressions 20 of, say, the sheet 19', overlie the elevations 21" of the adjacent sheet 19". The sheets are welded together at their points of contact. The hollow spaces formed between adjacent sheets are filled with mineral matter 22 consisting of granules of preferably uniform size. Openings provided in the end plate 23 welded to the sheets permit entry and removal of the filling. If not in use, these openings are closed by means of screw plugs 24. A flange 25, welded to another end plate, permits connection between the end plate and other, similarly constructed plates, as illustrated in Fig. 10. If, for example, the shaped structure shown is to be used as an armor plate consisting of steel laminations totaling 35 cm. in thickness, the individual laminations may be approximately 1.5 cm. thick while the size of the filling material granules should average 2 cm.

Figure 11:
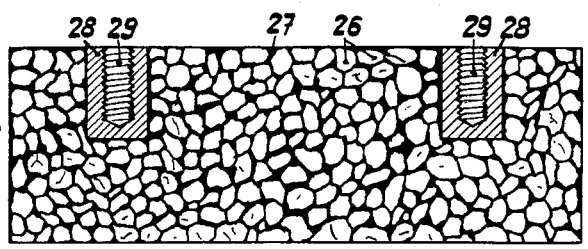
Figs. 11 and 12 show two different embodiments of the invention wherein a filling material has been cast into the basic material.

Fig. 11 illustrates a plate structure wherein the mineral filling material 26 is cast into the basic material 27 in the form of granules of varying dimensions. The volumetric ratio between the filling material and the basic material (filling coefficient) is practically uniform throughout the entire body. Connecting members 28 with screw threads 29 are cast into the structure for attachment to other similar structures or for fastening other elements to the structure. It will prove advantageous in certain cases to cast parts of a machinable material into the structure and to machine them, subsequent to the casting, for the particular function they are to serve.

Thin-walled shaped bodies may, obviously, contain only small-size granular filling material, which is preferably mixed into the basic material prior to casting.

Figure 12:
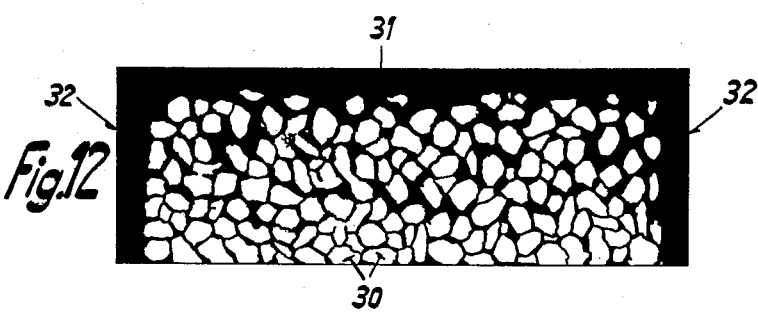

The filling material 30 is cast into the basic material 31 of the structure illustrated in Fig. 12. However, the filling coefficient, on the assumption that the particular body will be subject to bending stresses, is locally adapted in such a manner that the basic material is concentrated in the zone of tension (top) while the filling material is concentrated in the zone of pressure (bottom). The marginal zones 32 of the plate contain no filling material in order to enable the plate to be welded to other plates, etc.

Figure 13:
Fig. 13 is an embodiment of a structure according to the invention wherein the components of the structural material are pressed together by lamination.

The plate illustrated in Fig. 13 comprises a plurality of sheets 33 of the basic material pressed together with intermediate layers of filling material 34 therebetween. The thickness of the sheets corresponds to the average size of the granules.

Figure 14:
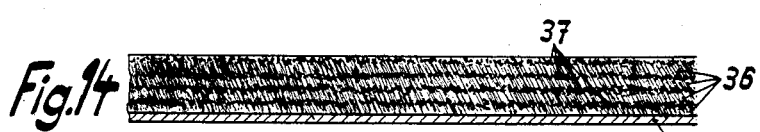
Fig. 14 is the embodiment of a structure formed by spraying component parts onto a mold.

The plate structure illustrated in Fig. 14 comprises a mold 35 on which the basic material 36 and an arenaceous filling material 37 are sprayed in several alternating layers.

Plates or parts made of the new structural material and comprising one or several laminations permit an easy and extremely firm connection in overlapping relation. The tips of the depressions and elevations of one plate engage similar depressions and elevations of the adjacent plate and are held in this position by conventional means, cementing alone producing bonds of high tensile strength with thin laminations of thicknesses up to 1 mm.

A further advantage of the herein-described structural material over ferro-concrete structures which has not been previously mentioned, is that such structures, particularly if made by means of casting, may be used immediately while concrete takes a considerable time to set. Moreover, structural material of the herein-disclosed type, say in form of bearing pillars, utilizes the compressive strength of hard broken stones, quantitatively their most important component, permitting a load of up to 4000 kg./cm.$^2$, while in the case of concrete pillars the same material can be utilized only up to the compressive strength of the cement binder, viz. a load of approximately 300 kg./cm.$^2$.

Any given weight of the new structural material, with or without filling material, combines a maximum of elasticity with a maximum of admissible load. It withstands great and sudden temperature changes without the dangerous internal stresses resulting in cracks, and it acts as a highly efficient insulator against temperature differentials, sound and vibration. Moreover, it is practically rupture-proof, even under great deformation stresses.

The structures according to this invention may be employed as structural elements or be formed directly into shaped bodies. For example, bodies of plate-like, dome-like, pillar-like, tubular or boiler-like shape may be made therefrom. Entities, including high-pressure boilers, made from material according to the invention are free from internal stresses in any dimension, irrespective of whether they have been produced by rolling or casting operations. Even frozen boilers or radiators, when thawed, will not crack but expand elastically and resume their former shape. Various alterations in respect of the structure of the said shaped bodies, the type of the material employed and special constructional features may be effected without departure from the scope of the invention.

One of the preferred uses of structural material according to this invention is that of producing armor surfaces. With the constant development of projectiles and explosive charges the demands made on armor plate are gradually increasing. Various means have been devised of increasing the impact resistance of armor plate without further addition to the thickness of the plate. Generally speaking, the action of a flat plate extending normally to the direction of a projectile may be compared with the action of a taut rope subjected to a stress intermediate the points of suspension. The more taut the rope, the greater will be the stress caused by a given load or, expressed differently, the stress will be reduced proportionately to the resiliency of the rope and the danger of rupture will be similarly reduced in case of a resilient rope. In view of this, an armor plate should be constructed in such a manner that every section subject to the impact of a projectile is resilient in every conceivable direction of approach of the said projectile. According to the present invention this object is attained. Such armor plate may be of a construction similar to the corrugated diaphragm of an aneroid barometer. It was found particularly advantageous to shape the depressions and elevations as domes, or hollow hemispheres. In order to produce armor plate with the necessary rigidity it is advisable to build up several sheets of the described structure into a laminated body, and to dispose the sheets in such a manner that the depressions of one sheet overlie the elevations of the adjacent sheet, the points of contact being connected by welding or riveting, or by casting the entire structure in one piece.

Rigid armor plate may be constructed in this manner having a resiliency far superior to that of a flat armor plate. Nevertheless, the plate, as a whole, has far greater rigidity and bearing strength than conventional armor plate. Experiments have shown that the impact resistance of armor plate constructed according to this invention, when using identical quantities of basic material is a multiple of that of conventional armor plate. Apart from the reasons outlined above, the superiority of armor plate according to this invention resides in the fact that the section hit by the projectile is not scattered at the point of impact as is the case of conventional armor plate but, due to its curved shape and resilient character, drastically resists the impact of the projectile. It is obvious that the exterior shape of the armor plate also increases the likelihood of deflection of the projectile.

The mineral filling material disposed in the hollow spaces of the armor plate serves a number of purposes. Principally, it is called upon to slow down the entering projectile. It is, therefore, advantageous to employ a filling material possessing a high degree of hardness and a high coefficient of friction. The material is, of course, crushed by the entering projectile, but it thus consumes the kinetic energy of the projectile and resists the further penetration of the projectile in a high degree. The pressure which the projectile exerts upon the armor plate is thereby scattered in a wide-angled cone so that the kinetic energy of the projectile is distributed over a considerable area which is resilient and increases as penetration progresses. It is not advisable to cast concrete into the hollow spaces because concrete would constitute a rigid component having a large moment of inertia. Moreover, concrete is too soft and, being devoid of hollow spaces between individual particles, fails to oppose the transmission of heat or to disperse the flash. For this reason the filling material within hollow spaces is preferably granular. A high filling coefficient may be achieved by means, such as vibrators. A further function of the filling material is to reduce the fusing action of certain projectiles, particularly projectiles with hollow charges. For this purpose the filling material preferably possesses a higher melting point, and a thermal conductivity several times lower than that of the basic material. These conditions are fulfilled for example, by a combination of steel and steatite or corundum as the melting point of the latter material lies far above that of steel. An armor plate of the above described construction is suitable for any type of armor both for armored cars (tanks) and ships, in particular submarines, and for aircraft, gun shields, fortresses, shelters and the like.

In many cases of metal construction, and particularly steel constructions of all kinds, low weight structural materials or structural elements are required which, nevertheless, possess the strength and heat resistance of conventional materials. Structural materials of this invention comply with these requirements. The basic material suitable in such cases is a metal, most frequently steel, which lends the element the necessary strength (tensile and bending strength), while as filling material pebbles may be used whose specific weight is considerably lower than that of the basic material, such as steel. Aluminum alloys of which some are comparable to steel in respect of tensile strength are particularly suitable for use as basis material owing to their small weight.

If the structure is not required to be highly heat resistant, non-metallic materials, such as plastics, may serve as basic materials. The polyamides known under the trade names of Nylon and Grilon were found to be suitable in lieu of steel.

The demands made on the filling material may vary widely according to the use to which the material is put. In general, materials possessing great hardness and high compressive strength, such as quartz, particularly hard basalt, silicon carbide and corundum, will be preferred. For special uses hard glass, hard porcelain, steatite or the like may be used as filling material. It is obvious that the filling material may be a mixture of various mineral substances. For structures and structural elements exposed to high heat, filling materials will be preferable whose melting point is higher and whose heat conductivity is lower than that of the basis material.

In order to replace structural materials, e. g., steel or concrete, by a structural element of the kind described possessing lesser weight and higher strength respectively, certain limits must be observed in respect of the mechanical strength of the individual components. It may thus often be found advantageous to employ a basic material possessing a tensile strength of not less than 4000 kg./cm.$^2$. The realizable values are approximately 8000 for steel, 4500 for certain aluminium alloys and approximately 4500 kg./cm.$^2$ for nylon. On the other hand, the filling material should have a tensile strength of not less than 4000 kg./cm.$^2$ and a hardness of at least 7 (Mohs' hardness), values that may be attained with materials such as quartz and corundum. All disadvantages inherent in the basic material if applied alone, such as great weight, insufficient heat resistance, high heat conductivity, and high price of the basic materials, and low tensile strength (usually below 800 kg./cm.$^2$) concomitant with brittleness of the filler, may be substantially eliminated by the herein disclosed combination of the two components.

As far as the shape of the structural material is concerned, any shape and form may be produced. The structure may be a hollow body consisting of the basic material in which the interior space is filled with filling material in coarsely or finely granular form. It is advantageous in many instances to subdivide the interior space into a plurality of hollow spaces.

A further embodiment of the work material according to my invention has the filling material cast into the basic material. Casting is preferably effected under pressure, such as a pressure of 10 atmospheres, so that the mineral inclusions are pre-tensioned. The object can be attained by working with heated materials. The basic material usually contracts to a greater extent on cooling or solidification than the filling material, so that the latter is compressed upon cooling.

The applications of cast structures of this type are practically unlimited. With steel as the basic material, the structural element can replace an element made of steel alone in almost all practical cases since the lattice-like structure provides a mechanical strength practically identical with or only inconsiderably lower than steel. Moreover the saving in weight and costs which may reach 50 per cent and more, the reduced heat conductivity and, in certain cases, the increased heat resistance are of greatest importance. The use of an aluminium alloy as basic material enables a further weight reduction.

Such structures may, for instance, be adapted as elements in the construction of at least part of the hull of a ship or aircraft. The saving in weight has a very favorable effect on the energy required for the propulsion of these and other vehicles. Plate-like bodies may be manufactured for use as structural elements for certain floor finishes. Road surfaces and runways for aircraft embodying the present invention are much less subject to wear and tear than similar structures made of concrete or gravel. In addition, due to the presence of the mineral filling material, which should be present in large amounts for such purposes, such surfaces have a far better "grip" than steel runways, for instance. Moreover, decorative floors, window-cases and doorposts may be made of the material. In order to enhance their attractiveness, regularly shaped stones of identical or different colors arranged in mosaic may be used on the surface while the non-ferrous metal used as basic material is made visible at the joints. The cast body may also be designed as an explosive charge, a nonmetallic material serving as basic material in certain cases. This is of particular advantage if the explosive charge is a mine because, due to the absence of metallic components, it cannot be detected by means of the usual mine detectors. Structural material of this type is of particular value in the construction of safes. It is practically impossible to destroy by means of welding torches safes made of this material. Finally, structures according to the present invention can be used as poles or at least as parts thereof. Poles so constructed (e. g. poles for electric transmission systems) will prove far more resistant against the effects of the weather, e. g. sand storms in deserts, than poles made of steel or concrete.

According to a fundamentally different embodiment of the present invention, the filling material is pressed together between sheets of the basic material, in layers of a thickness comparable with the size of the granules. Structures of this type are preferably produced by means of a rubber plunger in order to achieve an intimate juncture of the components. In addition, a binding agent with high binding power, such as a cellulose binder, may be used to bind the sheets and the filling material. Furthermore, the sheets may be connected by means of rivets, screws or by welding at predetermined points and around the edges. This embodiment is particularly suited to the manufacture of helmets akin to steel helmets, the preferred material for the sheets of approx. 1.0 mm. thickness being a material of lesser weight, such as plastic. The most suitable filling material is quartz sand whose granules should, for this purpose, be of a diameter of approximately 1 mm. Of course the application of the structures of the kind described is not restricted to the above-mentioned example.

Comparable to cast structures is an embodiment wherein the basic material and the filling material are applied on a mold in alternating coats. The mold may constitute part of the structure or merely serve for the manufacture thereof. The components may, for instance, be sprayed upon the mold, but the application of the components to the mold may also be effected by dipping. In either case, the filling material must be applied prior to the solidification of the basic material in order to ensure perfect inclusion of the filling material between continuous layers of the basic material. This embodiment of the invention is particularly adapted to the manufacture of thin-walled bodies, such as thin armor plate, steel helmets and the like. Complete armoring of armored cars, ships and the like, but also individual armor shields or steel helmets may be reinforced subsequent to manufacture and adapted to increasing demands made upon them. Damage caused to armor of all types by hits or other causes may be easily and satisfactorily repaired as well as the metallic wall elements of vehicles, structures and bodies of all kinds exposed to extraordinarily severe weather conditions such as sand storms, sea water and the like, or if their strength and durability is to be increased for any reason.

I claim:

1. A structural material comprising a sheet member covered over substantially the entire utilizable sheet area with elevations which all have a curved cross section in every direction of the sheet plane and are arranged so that no more than two of said elevations are in alignment with each other in one given direction of stress.

2. A structural material comprising a sheet member covered over substantially the entire utilizable sheet area with elevations and depressions which all have a curved cross section in every direction of the sheet plane and are arranged so that no more than one of said elevations and said depressions are in alignment with each other in one given direction of stress.

3. In a structural material according to claim 2, said curved elevations and depressions being immediately adjacent to each other in different coordinate directions of the plane of the sheet so that all lines of stress are curved in every direction of stress.

4. A material according to claim 2, characterized by the fact that the sheet member is provided throughout its area with closely adjacent depressions and elevations so that all the lines of stress are curved in every principal direction of stress.

5. A structural material comprising a number of laminations, each lamination consisting of a sheet member covered over substantially the entire utilizable sheet area with elevations and depressions which all have a curved cross section in every direction of the sheet plane and are arranged so that no more than one of said elevations and said depressions are in alignment with each other in one given direction of stress, said laminations being formed so that the depressions of one member at least partly overlie the elevations of the adjacent member.

6. A material according to claim 5 characterized by the fact that at least two laminations possess a different number of depressions and elevations.

7. A material according to claim 6 characterized by the fact that at least one exterior lamination possesses a larger number of depressions and elevations than the interior laminations.

8. A material according to claim 6 characterized by the fact that the number of depressions and elevations in one lamination intermediate of two points of contact is an even multiple of the number of depressions and elevations in the other lamination.

9. A material according to claim 5 characterized by the fact that at least two laminations possess depressions and elevations of different size and shape.

10. A material according to claim 5 characterized by the fact that the said members are cast integrally.

11. A material according to claim 1 characterized by the fact that at least one of its surfaces vertical to the principal directions of stress is covered by a material with a flat surface.

12. A material according to claim 1 characterized by the fact that a mineral filling material is disposed in the hollow spaces of the member.

13. A material according to claim 12 characterized by the fact that the filling material is granular.

14. A material according to claim 1 characterized by the fact that said sheet member as a whole has a curved shape.

15. The method of producing a honeycomb-type structural material, which comprises forming sheets of laminations each having substantially the entire sheet area covered with elevations which all have a curved cross section in every direction of the sheet plane and are arranged so that no more than two of said elevations are in alignment with each other, joining a plurality of said laminations together in face-to-face relation having said elevations of one lamination placed in registry with respective elevations of an adjacent lamination whereby hollow spaces are formed between said laminations, and filling said spaces with granular filler substance.

16. A material according to claim 12 characterized by the fact that the volumetric ratio between the material of said sheet member and the filling material is substantially uniform throughout the structural material.

17. A material according to claim 12 characterized by the fact that the volumetric ratio between the material of the sheet member and the filling material is locally varied and that a larger proportion of sheet material is concentrated in zones of tension and a larger proportion of filling material is concentrated in zones of pressure.

18. A material according to claim 17 characterized by the fact that means are provided for connecting the structural material with other materials or elements, that the said means for connection are cast into the structural material and consist of a material allowing subsequent machining.

19. A material according to claim 12 characterized by the fact that the filling material in thin layers is pressed together with the member and that the connection is strengthened by a binding agent or cement.

20. A material according to claim 15 characterized by the fact that the material of the member and the filling material are applied to a carrier in alternating layers.

21. A material according to claim 20 characterized by the fact that the components are sprayed on to the carrier.

22. A shaped body made of material according to claim 1 characterized by the fact that it is formed as a stress-free and self-supporting shell.

23. A shaped body made of material according to claim 1 characterized by the fact that it is formed as tubular pole-shaped structure.

24. A shaped body made of material according to claim 1, characterized by the fact that it is formed as a curved body and that it consists of a synthetic plastic.

References Cited in the file of this patent

UNITED STATES PATENTS

| | | |
|---|---|---|
| 331,469 | Baker | Dec. 1, 1885 |
| 662,567 | Von Lipowska et al. | Nov. 27, 1900 |
| 1,158,667 | Fairchild | Nov. 2, 1915 |
| 1,685,320 | Finley | Sept. 25, 1928 |
| 1,984,653 | Palmer et al. | Dec. 18, 1934 |
| 2,020,639 | Grayson et al. | Nov. 12, 1935 |
| 2,129,488 | Bomberger | Sept. 6, 1938 |
| 2,310,154 | Schlenker | Feb. 2, 1943 |
| 2,423,870 | Blessing | July 15, 1947 |
| 2,481,046 | Scurlock | Sept. 6, 1949 |

OTHER REFERENCES

New Finish for Sheet Metal, July 1945, published in Sheet Metal Worker, page 39.